Nov. 20, 1962  G. V. KARLSSON  3,064,997

SOCKET PIPE

Filed Oct. 13, 1958

INVENTOR
GUSTAF VALFRID KARLSSON
BY
ATTORNEY.

United States Patent Office 3,064,997
Patented Nov. 20, 1962

3,064,997
SOCKET PIPE
Gustaf Valfrid Karlsson, Hagastromsvagen 21,
Hagastrom, Sweden
Filed Oct. 13, 1958, Ser. No. 766,765
3 Claims. (Cl. 285—22)

The present invention relates to a socket pipe having at its one end a socket with a greater inner diameter than the outer diameter of the pipe itself, which socket is adapted to embrace, with interposed sealing material, the socketless end of a similar socket pipe, a shoulder, knob, step or the like being arranged inside the socket or on the outside of the pipe and having a supporting surface for guiding the pipe in the socket.

It is heretofore known to provide such socket pipes with shoulders, knobs or steps in the socket for guiding and centering the smaller end of a coaxially arranged, similar socket pipe. The previously used shoulders or steps are bevelled or chamfered in one direction, either axially or circumferentially (peripherally) relative to the socket. It has, however, proved in practice that it is very difficult—often completely impossible—to get the joint fully tight between such socket pipes, wherefore it is a common desire to establish a socket pipe with a shoulder or step which will make the joint fully tight. This is now possible by making the socket pipes in accordance with the present invention.

It is, therefore, one object of the present invention to provide a socket pipe wherein the supporting surface or plane has substantially the form of a part or portion of a cylinder surface of a diameter which, when the shoulder is arranged inside the socket, corresponds with the outer diameter of the pipe and which, when the shoulder is arranged on the outside of the pipe, corresponds with the inner diameter of the socket, the shoulder being bevelled axially relative to or towards the socket as well as circumferentially or peripherally. The peripheral bevels or chamfers may be formed with surfaces which are parts of cylinder surfaces.

Figure 1:
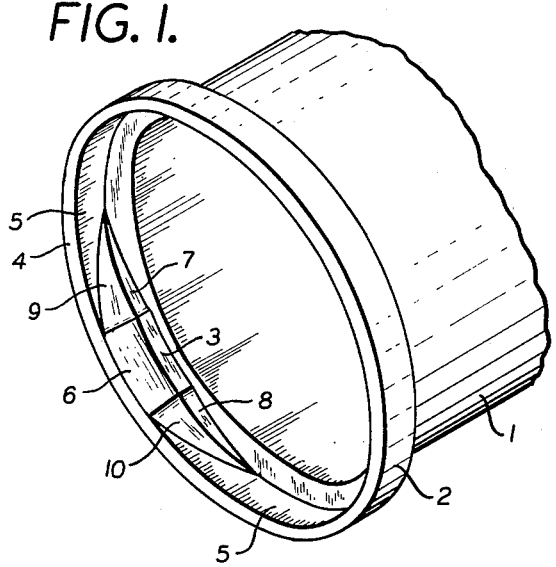
Figure 2:
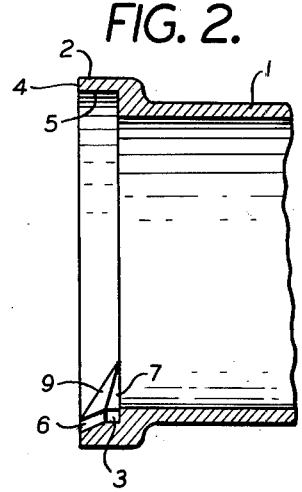
Figure 3:
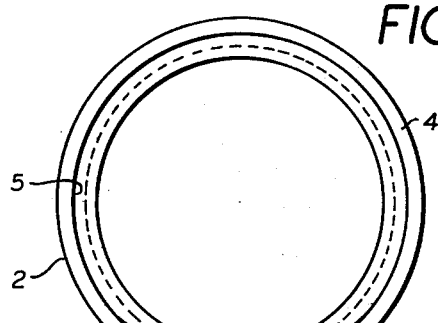
Figure 4:
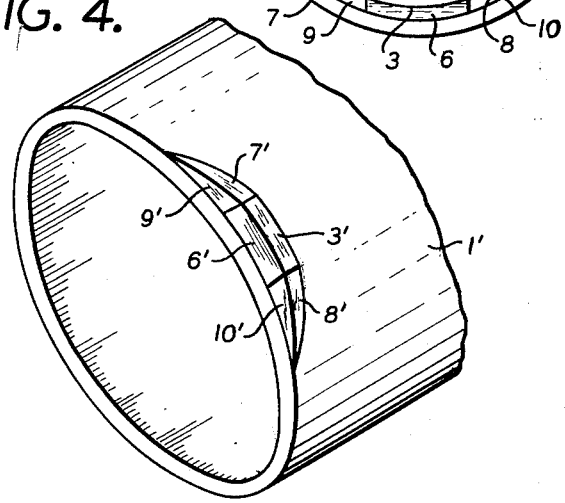
Figure 5:
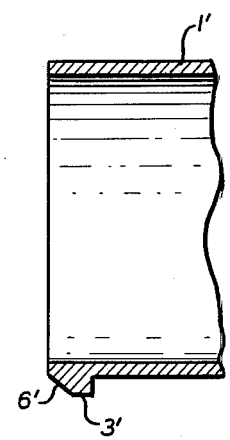

With this and other objects in view, which will become apparent in the following detailed description, the present invention will be clearly understood in connection with the accompanying drawing, in which:

FIGURE 1 is a perspective end view of the socket end of the pipe;
FIG. 2 is a vertical section through the pipe disclosed in FIG. 1;
FIG. 3 is an end view of the socket end pipe;
FIG. 4 is a perspective view of the spigot end of the pipe; and
FIG. 5 is a vertical section through the pipe disclosed in FIG. 4.

Referring now to the drawing, the socket pipe 1 is provided at one end with the socket 2. The socket 2 is arranged in such a manner that the smaller end of a similar socket pipe can be inserted with interposed sealing material. On the inside of the socket 2 and in particular at its bottom portion is provided a shoulder shaped with a portion 3 forming a part of a cylinder having the same radius as the outer surface of the smaller end of the similar socket pipe. From this cylindrical portion 3 the shoulder is bevelled or chamfered both axially towards the mouth 4 of the socket 2 and circumferentially or peripherally towards its inner surface 5 of larger diameter. The axial bevel 6 and the peripheral bevels 7 and 8, respectively, are clearly shown in FIG. 1. The peripheral bevels 7 and 8 are suitable parts of a cylinder. The portions 9 and 10 between the axial bevel 6 and the peripheral bevels 7 and 8 are bevelled towards the inner surface 5 of the socket 2.

Thanks to the shoulder structure described above the socket pipes may readily be joined together and the sealing material readily pressed in so as to tighten between the outer surface of the smaller end of one pipe and the inner surface of the socket of an adjoining pipe. The sealing material may very easily be pressed in at the bevelled portions of the shoulder. If it happens that the smaller end of the socket pipe is accidentally placed eccentrically in the socket so that it lies on either one of the peripheral bevels 7 and 8, it may easily be adjusted to the correct position.

The embodiment described above provides the shoulder in the socket end of the pipe. The shoulder may, however, as well be arranged at the outer side of the smaller end of the pipe 1'. In this case the portion 3' shall be placed nearest to the pipe end and the axial or radial bevel 6' shall be directed towards the outer periphery of the pipe 1' and the peripheral bevels 7' and 8' extend like-wise to the outer periphery of the pipe 1', forming the bevelled faces 9' and 10' therebetween. The joining together of such pipes is performed in the same manner as described above.

While I have described two embodiments of the present invention, it is to be understood that these embodiments are given by example only and not in a limiting sense, the scope of the present invention being determined by the objects and the claims.

I claim:
1. A joint for two pipes to be connected tightly, comprising
a first pipe having a socket at one end thereof,
a second pipe having a spigot at one end thereof,
said spigot being received in said socket of said first pipe,
said socket of said first pipe and said spigot of said second pipe constituting cooperating elements for a tight connection of said pipes,
said socket having an inner diameter larger than the outer diameter of said spigot,
one of said elements having an axially extending shoulder projecting radially from a peripheral surface of said one of said elements to form an arcuate surface engaging an oppositely disposed complementary peripheral surface on the other of said elements in the connected position of said pipes,
a peripherally bevelled surface extending from each end of said arcuate surface of said one of said elements to the periphery of the latter, and
a bevelled surface extending radially outwardly from said arcuate surface of said one of said elements to the periphery of the latter.

2. A joint for two pipes to be connected tightly, comprising
a first pipe having a socket at one end thereof,
a second pipe having a spigot at one end thereof,
said spigot being received in said socket,
said socket having an inner diameter greater than the outer diameter of said spigot,
said socket having an axially extending shoulder projecting radially from an inner peripheral surface of said socket to form an inner arcuate surface engaging a complementary outer peripheral surface on said spigot,
a first bevelled surface extending peripherally from each end of said arcuate surface of said shoulder to the inner periphery of said socket, and
a second bevelled surface extending radially outward from said arcuate surface of said shoulder to the inner periphery of said socket.

3. A joint for two pipes to be connected tightly, comprising
a first pipe having a socket at one end thereof, a second pipe having a spigot at one end thereof,
said spigot being received in said socket,
said socket having an inner diameter greater than the outer diameter of said spigot,
said spigot having an axially extending shoulder projecting radially from an outer peripheral surface of said spigot to form an outer arcuate surface engaging a complementary inner peripheral surface on said socket,
a first bevelled surface extending peripherally from each end of said arcuate surface of said shoulder to the outer periphery of said spigot, and
a second bevelled surface extending radially outward from arcuate surface of said shoulder to the outer periphery of said spigot.

References Cited in the file of this patent

UNITED STATES PATENTS

| | | |
|---|---|---|
| 462,052 | Knowles | Oct. 27, 1891 |
| 2,567,639 | Fulton | Apr. 9, 1948 |
| 2,706,122 | Bright | Apr. 12, 1955 |

FOREIGN PATENTS

| | | |
|---|---|---|
| 3,513 | Great Britain | Feb. 19, 1894 |
| 21,894 | Great Britain | Oct. 18, 1898 |